United States Patent [19]

Alexander et al.

[11] Patent Number: 4,775,305
[45] Date of Patent: Oct. 4, 1988

[54] WINDSHIELD REPAIR DEVICE

[76] Inventors: George E. Alexander, 61308 Mt. Vista Dr.; Thomas R. Spoo, 60388 Woodside Loop; Von L. Alexander, 61233 Mt. Vista Dr., all of Bend, Oreg. 97702

[21] Appl. No.: 120,984

[22] Filed: Nov. 16, 1987

[51] Int. Cl.$^4$ .............................................. B32B 35/00
[52] U.S. Cl. ...................................... 425/12; 156/94; 264/36; 425/13
[58] Field of Search ............... 156/94; 264/36; 425/12, 425/13

[56] References Cited

U.S. PATENT DOCUMENTS

| | | | |
|---|---|---|---|
| 4,200,478 | 4/1980 | Jacino et al. | 156/94 |
| 4,385,015 | 5/1983 | Klettke | 264/36 |
| 4,555,295 | 11/1985 | Orikasa et al. | 425/13 X |
| 4,569,808 | 2/1986 | Smali | 264/36 |

Primary Examiner—Robert A. Dawson
Attorney, Agent, or Firm—Robert L. Harrington

[57] ABSTRACT

A device for repairing windshield cracks. A cylinder includes a sealing mouth adapted to contain a quantity of filler material. The mouth with filler material therein is positioned over the crack opening. The cylinder includes a small cavity adjacent the mouth and a larger upper cavity. A plunger fitted to the cylinder carries a lower seal for the small cavity and an upper seal for the larger cavity. Moving the plunger from an initial fully depressed to a fully retracted position opens the small cavity to the upper cavity whereby the vacuum of the upper cavity enhances the evacuation of air from the crack. Subsequent depression of the plunger is assisted by a one-way exhaust valve. Such depression of the plunger produces injection of the filler material into the crack replacing the evacuated air.

5 Claims, 2 Drawing Sheets

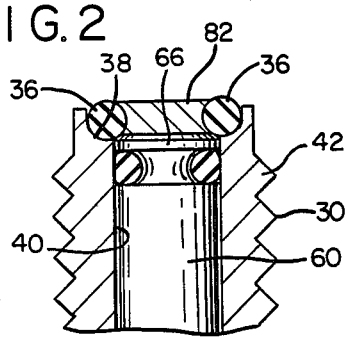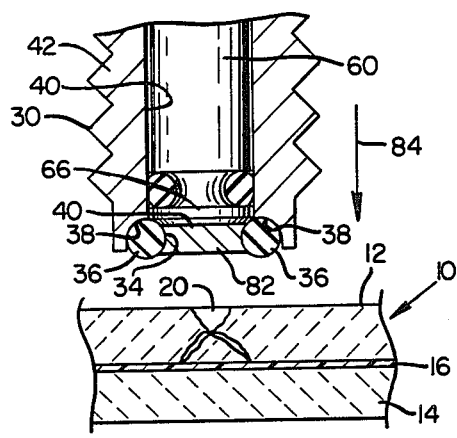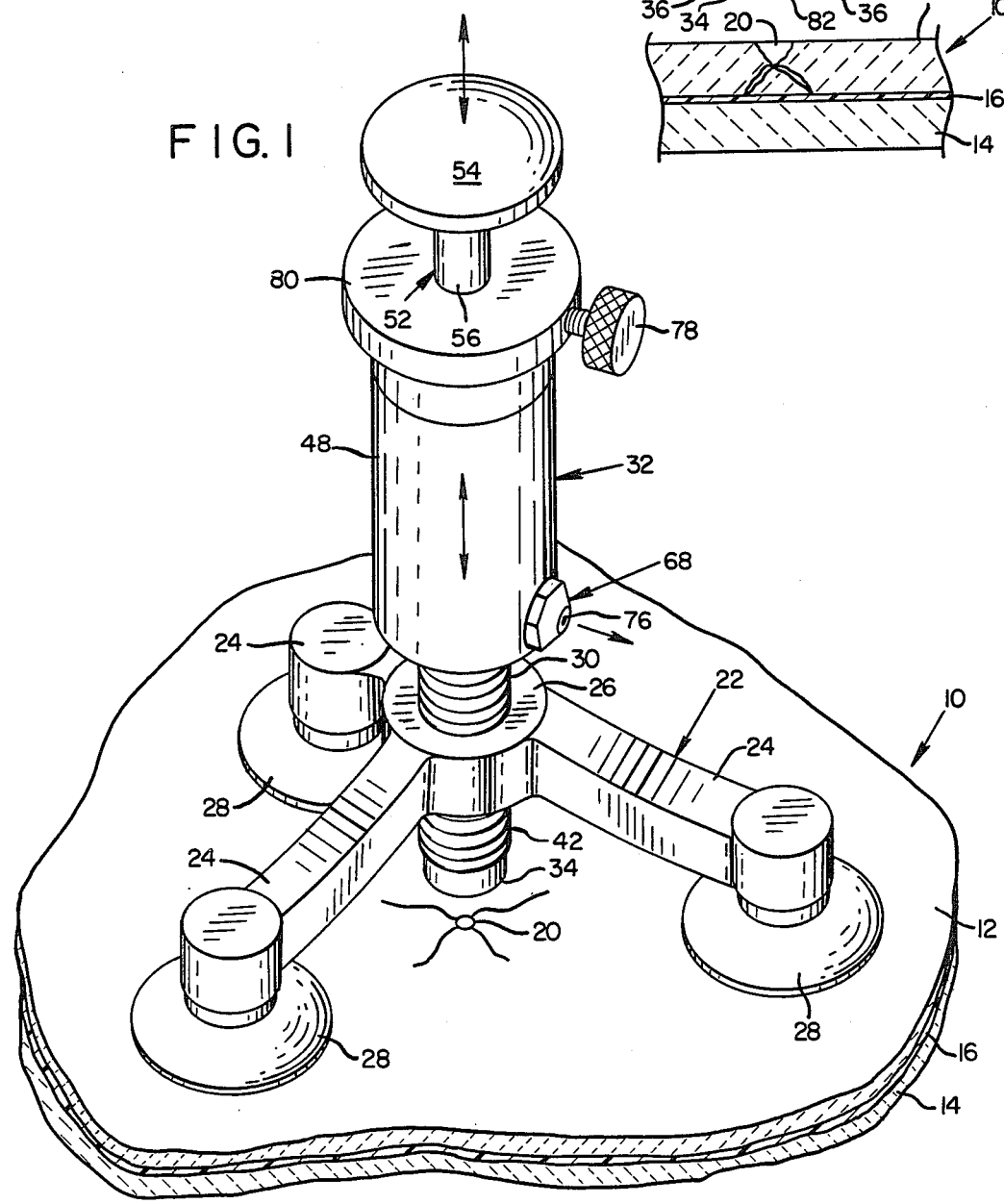

WINDSHIELD REPAIR DEVICE

FIELD OF INVENTION

This invention relates to a device used to repair windshield cracks by injecting a liquid bonding material into the crack.

BACKGROUND OF THE INVENTION

Perhaps the most common of all damages to a vehicle is windshield damage. Stones and rocks from the roadway are kicked up by vehicle tires and strike the windshield, causing the glass to fracture. Windshields typically include an inner glass layer or plate and an outer glass layer or plate separated by a sheet of tough mylar or other transparent plastic material. Each of the glass layers are highly shatter resistent and even when the outer plate is pitted or cracked, the windshield may be quite serviceable except for the crack being visible. The visible fracture is annoying and can impair the driver's vision of the road. For these reasons, cracked and/or pitted windshields are commonly replaced at a very substantial cost, typically in the hundreds of dollars. (Whereas windshield fractures are of varying types and descriptions, they will often herein be collectively referred to as cracks.)

Recently, developments have been made for repairing windshields having cracked outer glass layers. The concept is quite simple. The crack in the windshield is visible because of ambient air that resides in the openings of the crack. Because air has a different index of refraction than the glass, light is transmitted in a manner different than the glass and becomes visible. A liquid filler material injected into the crack so as to replace the air will make the crack invisible if that liquid has the same index of refraction as the glass. Such a liquid that will harden and bond securely to the glass provides the added benefit of reinstating the strength of the glass and inhibits any spreading of the crack.

A filler material that satisfies the needs of the present invention is a transparent resin identified as "Crack Weld" TM which is in liquid form until subjected to ultraviolet light. The liquid material is shielded from ultraviolet light (sunlight) until the air in the crack is replaced with the filler material so that the crack is no longer visible. Ultraviolet light is then applied and the filler material cures and hardens.

The concept is simple and the filler material is available. Not so readily available, however, is the apparatus or device to accomplish the task of injecting the filler material into the crack so as to remove or replace the air. The present invention is directed to a device for serving that purpose.

Before explaining devices that have been available heretofore and to which the present invention is an improvement, the reader needs to understand that there are two different kinds of cracks commonly considered for repair by the techniques that will be described. The first is what might be considered as a surface crack. The crack along its entire length is exposed to the atmosphere. By injecting the liquid filler material into the crack, the air is simply crowded out of the crack and thereby replaced. This type of crack does not create a very serious problem for prior devices. However, such damaged windshields are more likely not repairable. If the crack is of the second variety where it is largely formed under the surface with a small hole into the crack, as it frequently is when struck by a small object, simply injecting the filler material into the crack will not get rid of the air which becomes trapped under the surface.

Devices that have been developed for repairing cracks incorporate a mechanism in some respects having the features of an air pump. The small opening into the crack is sealed by the device so as to communicate only with an air chamber or cylinder of the device. A vacuum is drawn to remove air from the crack. The filler material is injected into the device adjacent the opening to the subsurface crack (e.g. through a syringe) and the vacuum is released so that the filler material is drawn into the crack. Whereas the vacuum generating step does not remove all of the air, the process often must be repeated. Because of the relative properties of air versus the highly viscous filler material, air will be gradually withdrawn through the filler material until the air is totally replaced with the filler material and the crack becomes invisible.

Prior patents that function in this manner are U.S. Pat. No. 3,562,366 Sohl 02/09/71, U.S. Pat. No. 3,765,975 Hollingsworth 10/16/73, U.S. Pat. No. 4,132,516 Storey 01/01/79, and U.S. Pat. No. 4,200,478 Jacino 04/29/80.

BRIEF DESCRIPTION OF THE INVENTION

The present invention is distinguished from all prior known devices in the manner by which the air is extracted and replaced by the filler material. The present device includes a stepped cylinder cavity or cavities with a dual acting plunger. The cavity adjacent the crack opening (the lower end of the cylinder) has a small cross section that is fitted with a first sealing disk carried by the plunger. A second or upper cavity portion is substantially larger in cross section and is fitted with a second sealing disk also carried by the plunger. A one-way air valve (it exhausts only) is provided between the two cylinder portions. As the plunger is retracted, two separated vacuum chambers are formed, one below the first disk and one below the second disk.

Prior to the device being placed over the crack opening, the liquid filler material is placed at the mouth of the small cavity, i.e. with the device inverted. The device is then turned upright and the mouth of the device with the filler material therein, is fit over the crack opening. Because the mouth is very small, e.g. one-eighth of an inch in diameter, the filler material clings to the mouth of the device due to surface tension of the filler material.

As vacuum is drawn, the filler material remains positioned over the crack opening but allows passage of the air from the crack into the cavities. Initially the crack is exposed only to the vacuum of the small cavity. However, after a short distance the first disk enters the stepped portion of the cylinder and the crack opening is exposed to the greater vacuum created under the second sealing disk.

Reversal of the plunger has the effect of allowing the filler material to be injected into the crack. It is desirable, however, not to generate a high positive pressure but rather to simply encourage flow of the liquid material into the crack. As the pressure is increased to the point of exceeding ambient pressure, the one-way exhaust valve opens and pressure from the upper chamber is exhausted to atmosphere. The lower sealing disk takes over to eject some positive pressure as it again seals against the cross section of the small cavity.

The device of the invention, its differences and advantages, will be further appreciated by reference to the following detailed description and the drawings referred to therein wherein:

FIG. 1 is a perspective view of a device in accordance with the present invention;

FIG. 2 is an enlarged partial view of the mouth of the device of FIG. 1 in an inverted position, i.e. when filled with filler material;

FIG. 3 is a view similar to FIG. 2 as the mouth of the device is applied to a crack in a windshield;

Figure 4:
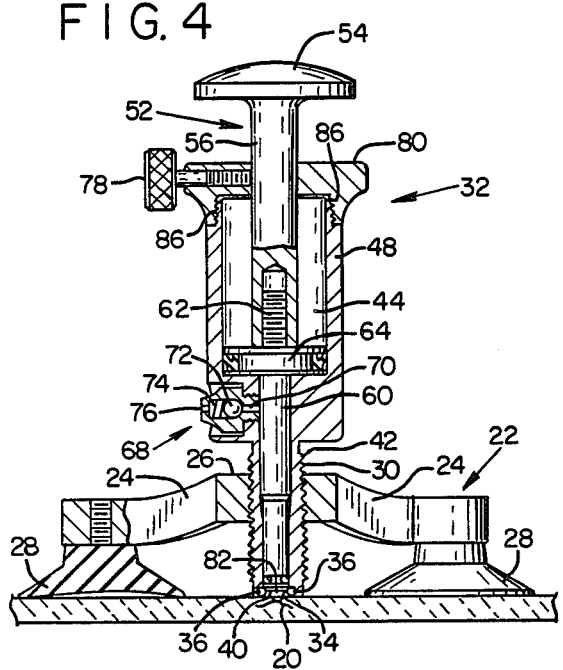
FIG. 4 is a cross sectional view of the device of FIG. 1 illustrating the initial position of the device.

Reference is first made to FIGS. 1 and 3 illustrating a windshield 10 consisting of an outer glass layer or plate 12, an inner glass layer 14 and center layer of a thin tough transparent plastic layer 16, e.g. mylar. This combination is typical of the safety glass construction used for windshields in vehicles. The fracture illustrated includes an opening (resulting from the impact of a stone or intentionally drilled) and radiating cracks extending down into the outer glass layer 12 and constituting a subsurface crack as previously described. The fracture in total will generally hereafter simply be referred to as a crack 20 in the windshield 12.

Generally, the windshield will not be considered repairable if the center layer 16 is damaged. The opening to the crack 20 is necessary and in those cases where the crack is totally subsurface, a hole is drilled down to the crack. In other instances, the opening may be too large for the mouth of the tool and in such instances a sealing ring or donut will be provided. The ring fits over the opening and reduces the size of the opening so as to fit the mouth of the tool. Such adaptations to oversized crack configurations are known to the industry and it will suffice to state that they are accommodated for the present tool in the conventional manner.

Referring now FIGS. 1, 3 and 4, the various components of the device will be explained. A tripod support 22 consists of three legs 24 radiating from a center ring 26 with downwardly directed suction cups 28 fitted to the outer extremities of the legs 24. The center ring 26 is threaded and is threadedly engaged with screw threads 30 provided on the lower body portion of cylinder 32. It will be understood that the bottom end of the threaded portion of cylinder 32 forms a mouth 34 that includes an O-ring seal 36 seated in an inset 38 at the bottom end of a lower cavity 40. It is the mouth of the device as defined by the O-ring seal 36 that is placed over the opening of crack 20 as illustrated in the drawings.

The cylinder 32 is comprised of an upper body portion 48 and a lower body portion 42 (on which screw threads 30 are provided). A cavity extends through the body portions 48,42 and includes a large diameter cavity 44 in the upper body portion 48, an intermediate cavity 46 in the upper region between the lower and upper body portions 48,42, and a small cavity portion 40 that extends upwardly from the mouth 34 to the intermediate cavity portion 46. The transition from the cavity 46 to the cavity 40 includes a tapered wall portion 50.

Residing in the cylinder 32 and extending through the cavities therein is a plunger 52. The plunger 52 includes a handle 54 and a shaft 56 protruded through an opening 58 in a cap 80 that is screwed onto the upper body portion 48 of the cylinder (note screw threads 86). The handle is exposed for manual manipulation of the plunger as will be later explained. The shaft 56 extends down through the opening 58 of cap 80 and is joined to an inner shaft 60, by screw threads 62. Shaft 60 includes a large sealing disk 64 at the top of inner shaft 60, and small sealing disk 66 provided at the bottom end of inner shaft 60. Gaskets or O-rings provided on the periphery of the sealing disks provide air seals, the larger disk 64 being sealed against the wall of the large cavity 44 and the smaller disk 66 against the wall of the lower cavity 40.

Figure 5:
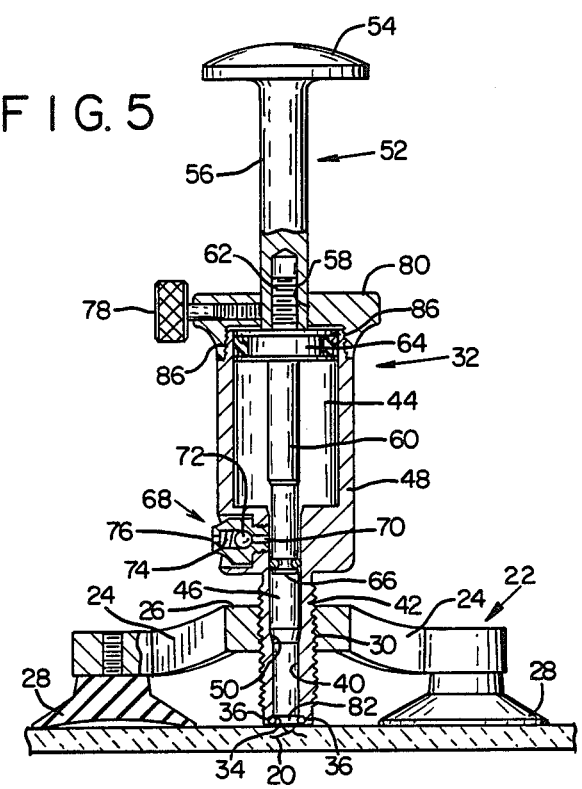
FIG. 5 is a cross sectional view similar to that of FIG. 4 with the plunger of the device in a fully retracted position.
Figure 7:
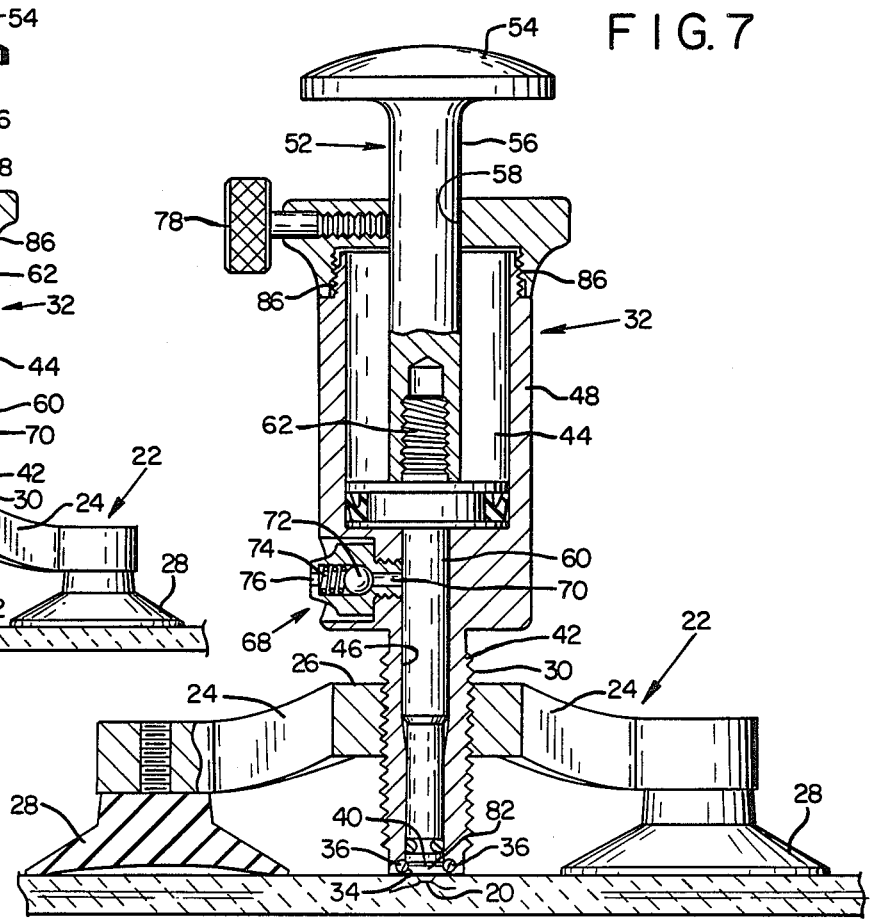
FIG. 7 is a cross sectional view similar to that of FIGS. 4 and 6 illustrating the plunger fully depressed.

The relationship of the plunger configuration and that of the cavity portions are such that with the handle 54 and shafts 56,60 fully depressed as viewed in FIGS. 4 and 7, the large sealing disk 64 is positioned at the bottom of the large cavity 44 and the small sealing disk is positioned in the mouth 34 of the lower cavity 40. With the handle 54 and shaft 56 fully retracted as shown in FIG. 5, the large disk is positioned at the top of the large cavity 44 and the small disk is positioned in the intermediate cavity portion 46.

Making up the remaining components of the cylinder 32 is a one-way exhaust valve 68 including an orifice 70 into the intermediate cavity, and a sealing ball 72 that normally is biased by compression spring 74 to close the orifice 70 and thereby prevent atmospheric air from entering the cavity portions through orifice 70. In the event of a pressure imbalance, i.e. with the cavity pressure higher than atmospheric air pressure, the spring 74 will be compressed to open orifice 70 to outlet 76 and thus to the atmosphere.

Finally a lock screw 78 extends through the cap 80 and is exposed to manual manipulation for screwing the lock screw 78 against or away from shaft 56 to lock or unlock the plunger in a desired position.

OPERATION

Having explained the various components of the device, its operation will now be explained.

Reference is first made to FIGS. 1 through 3. As previously explained when dealing with a subsurface crack, it is necessary to provide communication to the crack, i.e. through an opening as at center of crack 20. It may be necessary to drill a hole of, e.g. one-eighth inch, into the outer plate 12. In instances where the opening 20 is too large, a sealing ring or donut can be provided. These are well known to the art and need not be described. For the purposes of this explanation, hole or opening 20 is assumed to be of the proper size, e.g. one-eighth inch in diameter.

The first step following determination of the proper hole size is to unscrew tripod 22 from cylinder 32 and align the center of support ring 26 over the opening in crack 20. The suction cups 28 are pressed down onto the glass. This assures placement of the mouth of the cylinder over the crack opening when the cylinder is screwed into the support ring 26.

Next the filler material 82 is deposited inside the O-ring 36 as illustrated in FIG. 2, e.g. with a syringelike device. As shown, the plunger is in a near fully depressed position with the cylinder inverted. After receiving the filler material, the cylinder is turned over and screwed down into the tripod as illustrated by arrow 84 in FIG. 3. The filler material clings to the O-ring mouth 34 of the cylinder due to surface tension. The cylinder is screwed down onto the plate 12 with O-ring 34 sealing the opening of crack 20 so that the crack is sealed except for communication with the cylinder cavities. This is shown in FIG. 4.

The lock screw 78 is unscrewed and the plunger is fully retracted as illustrated in FIG. 5. In the initial stage of retraction, the lower cavity 40 is sealed by sealing disk 66 and the drawing of air from the crack 20 is very slight. As the sealing disk 66 crosses the transition area 50 in the upper end of cavity 40 (or the lower end of cavity 46) the cavity 40 and the crack in the plate 12 are exposed to the larger cavity 44. The substantially greater vacuum effected by disk 64 in cavity 44 (the exhaust valve maintained in its closed position by spring biased ball 72) is thus exposed to the crack and a much greater evacuation of air from the crack is accomplished (as compared to prior devices).

Figure 6:
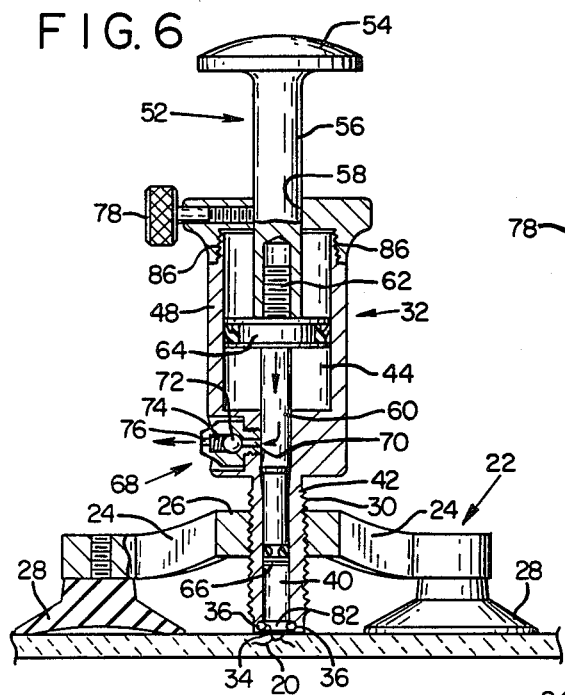
FIG. 6 is a cross sectional view similar to that of FIGS. 4 and 5 illustrating the plunger being depressed.

During the evacuation of air from the crack as described above, the air from the crack simply filters through the liquid filler material 82. FIGS. 6 and 7 illustrate the process of injecting the filler material into the crack. The filler material is liquid and even though contained in a vacuum, will tend to flow downwardly due to gravity. Upon depression of the plunger, a pressure differential is created above the filler material which, added to the gravity effect, causes the filler material to flow into the crack. Note, however, that as a positive pressure is achieved in cavity 44, ball 72 will be unseated and air will be exhausted out the valve as illustrated in FIG. 6. Upon full depression as shown in FIG. 7, the crack simply disappears, as previously explained, because the filler material has the same index of refraction as the glass plate 12.

In certain instances, some air may still remain in the crack, trapped by the filler material. The plunger action can be recycled in such event. In the recycling process, with the plunger fully retracted as shown in FIG. 5, lock screw 78 may be tightened to lock the plunger for a short time and thereby effect a holding of the vacuum. Such a vacuum creates a drawing effect on any air bubbles in the crack and they simply are caused to "float" or filter through to the surface of the filler material. Movement of the air bubbles can be observed by the operator. When the crack visually disappears, the operator knows he has a good bond and he simply exposes the filler material to sunlight or to artificial ultraviolet rays, causing the filler material to cure or harden. The device is then removed.

Those skilled in the art will readily appreciate the advantages of the invention. Sizes and shapes of the various components will be readily determined. Such sizes and shapes can be modified for a variety of repair projects without departing from the inventive concept. The inventive concept, at least in part, consists of a multiple cavity vacuum chamber that enables the filler material to be deposited in a small diameter mouth of the device, with the drawing of air primarily affected as the larger cavity is opened. The exhaust port is important to the pumping action and the device in general has been found to substantially improve on the repairing process of cracks in vehicle windshields.

We claim:

1. A device for repairing a sub-surface crack in a vehicle windshield wherein an opening is provided from the crack to the surface, said device comprising;

a multiple cavity cylinder, said cylinder having a top and a bottom and a passageway extended through the cylinder top and bottom and through the multiple cavities therein, a plunger contained in the cylinder and slidably extended along said passageway, the passageway configuration at the bottom of the cylinder forming a sealing mouth, said multiple cavities including an upper large diameter cavity and a lower small diameter cavity, said plunger including a shaft extending through the upper and lower cavities, an upper sealing member carried by said shaft and fitted to the large diameter of the upper cavity to form a movable seal in the upper cavity, a lower sealing member carried by said shaft and fitted to the small diameter of the lower cavity to form a movable seal in the lower cavity, said plunger projected through the cylinder top and manually actuatable to move the upper sealing member between upper and lower positions in said large cavity, and to move the lower sealing member between an upper position out of the lower cavity and a lower position in sealing engagement with the lower cavity adjacent the sealing mouth, said sealing mouth and lower sealing member forming a receptacle for a filler material to be injected into the crack, one-way exhaust means in said cylinder for exhausting air from said upper cavity during depression of the plunger, and mounting means for mounting the cylinder to the windshield with the sealing mouth surrounding the exposed opening of the crack and the filler material applied over the exposed opening, whereby retraction of the plunger draws air from the crack initially due to upper movement and air sealing engagement of the lower sealing member in the lower cavity, and then exposing said crack to the vacuum of the upper cavity created by the upward movement of the upper sealing member resulting in substantial evacuation of air from the crack, and whereby depression of the plunger allows the filler material to flow into the crack in place of the evacuated air.

2. A device as defined in claim 1 wherein the one-way exhaust means is a one-way exhaust valve.

3. A device as defined in claim 2 including a locking means for locking the plunger in a retracted position.

4. A device as defined in claim 3 wherein the mounting means is a support having legs provided with suction cups for attaching the support and thereby the cylinder to the windshield.

5. A device as defined in claim 4 wherein the support includes a threaded ring and the cylinder includes a threaded lower body portion that has threaded engagement with the threaded ring.

* * * * *